(12) United States Patent
Meng et al.

(10) Patent No.: US 7,517,097 B2
(45) Date of Patent: Apr. 14, 2009

(54) SLIDING LENS CAP FOR A LENS UNIT OF A PROJECTOR

(75) Inventors: Chi-Yu Meng, Chu Nan (TW); Jung-Chi Chen, Chu Nan (TW)

(73) Assignee: Coretronic Corporation, Miao Li County (TW)

( * ) Notice: Subject to any disclaimer, the term of this patent is extended or adjusted under 35 U.S.C. 154(b) by 500 days.

(21) Appl. No.: 11/339,118

(22) Filed: Jan. 24, 2006

(65) Prior Publication Data

US 2006/0221311 A1 Oct. 5, 2006

(30) Foreign Application Priority Data

Mar. 30, 2005 (TW) .............................. 94109974 A

(51) Int. Cl.
G03B 21/14 (2006.01)
G02B 23/16 (2006.01)
G03B 11/04 (2006.01)

(52) U.S. Cl. ....................................... 353/119; 359/511

(58) Field of Classification Search ................. 353/119, 353/97, 100, 101; 396/448; 359/511; 352/204, 352/207

See application file for complete search history.

(56) References Cited

U.S. PATENT DOCUMENTS

2003/0152381 A1* 8/2003 Tanabe ........................ 396/448
2005/0030493 A1* 2/2005 Wu .............................. 353/119
2005/0117129 A1* 6/2005 Ishino ......................... 353/119

* cited by examiner

*Primary Examiner*—William C Dowling
*Assistant Examiner*—Ryan Howard
(74) *Attorney, Agent, or Firm*—Ladas & Parry, LLP

(57) ABSTRACT

A sliding lens cap includes a slide plate formed with a slide track unit, and a fixing member adapted to be mounted on a projector adjacent to a lens unit of the projector and in sliding engagement with the slide plate at the slide track unit to permit slidable retention of the slide plate on the projector and to permit movement of the slide plate between covering and uncovering positions relative to the lens unit.

9 Claims, 4 Drawing Sheets

SLIDING LENS CAP FOR A LENS UNIT OF A PROJECTOR

CROSS-REFERENCE TO RELATED APPLICATION

This application claims priority of Taiwanese application No. 094109974, filed on Mar. 30, 2005.

BACKGROUND OF THE INVENTION

1. Field of the Invention

The invention relates to a lens cap, more particularly to a sliding lens cap for a lens unit of a projector.

2. Description of the Related Art

As shown in FIG. 1, a conventional lens cap 10 for covering and uncovering a lens unit 101 of a projector 100 is connected by a cord 11 to a housing of the projector 100 so that the lens cap 10 can be prevented from being misplaced when the lens cap 10 is removed from the lens unit 101. When operating the projector 100, the lens cap 10 is removed from the lens unit 101 and is suspended from the housing by the cord 11. After using the projector 100, the lens cap 10 is replaced on the lens unit 101 to cover the same. To retain the lens cap 10 covering the lens unit 101, the lens cap 10 is provided with an engaging mechanism to engage removably a periphery of the lens unit 101 such that a force is required to disengage the lens cap 10 from the lens unit 101, which results in inconvenience. Moreover, if an operator forgot to remove the lens cap 10 before operating the projector 100, the lens cap 10 will be subjected to a strong light from the projector 100 that can melt the lens cap 10.

SUMMARY OF THE INVENTION

Therefore, an object of the present invention is to provide a sliding lens cap that can be mounted directly on the housing of a projector, and that is slidable to cover and uncover a lens unit of the projector.

Another object of the present invention is to provide a projector having a sliding lens cap that cooperates with a switch component mounted adjacent to a lens unit of the projector to control an internal power supply circuitry of the projector.

According to one aspect of the invention, a sliding lens cap is adapted for covering and uncovering a lens unit of a projector, and comprises a slide plate formed with a slide track unit, and a fixing member adapted to be mounted on the projector adjacent to the lens unit and in sliding engagement with the slide plate at the slide track unit to permit slidable retention of the slide plate on the projector and to permit movement of the slide plate between covering and uncovering positions relative to the lens unit.

According to another aspect of the invention, a projector comprises a lens unit, a sliding lens cap for covering and uncovering the lens unit, an internal power supply circuitry, a switch component mounted adjacent to the lens unit and connected electrically to the internal power supply circuitry, and a switch actuator. The sliding lens cap includes a slide plate and a fixing member. The slide plate is formed with a slide track unit, and has an inner surface and an outer surface opposite to the inner surface. The fixing member is mounted adjacent to the lens unit, and is in sliding engagement with the slide plate at the slide track unit to permit slidable retention of the slide plate and to permit movement of the slide plate between a covering position and an uncovering position relative to the lens unit. The switch actuator is provided on the slide plate for actuating the switch component to enable the internal power supply circuitry to operate the projector only when the slide plate is disposed at the uncovering position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
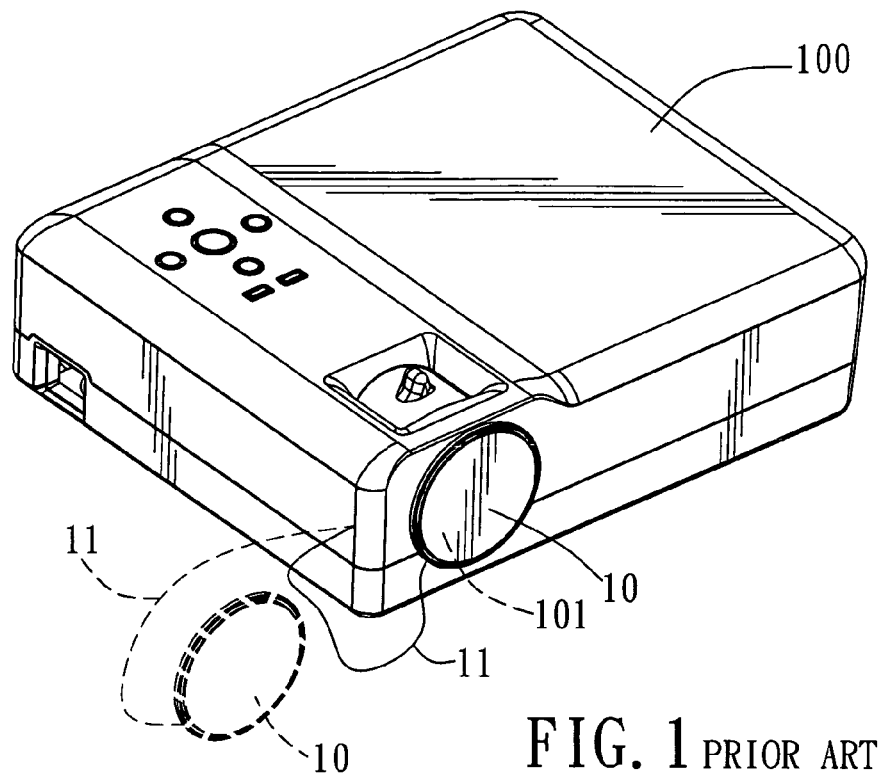
FIG. 1 is a perspective view of a projector with a conventional lens cap.
Figure 2:
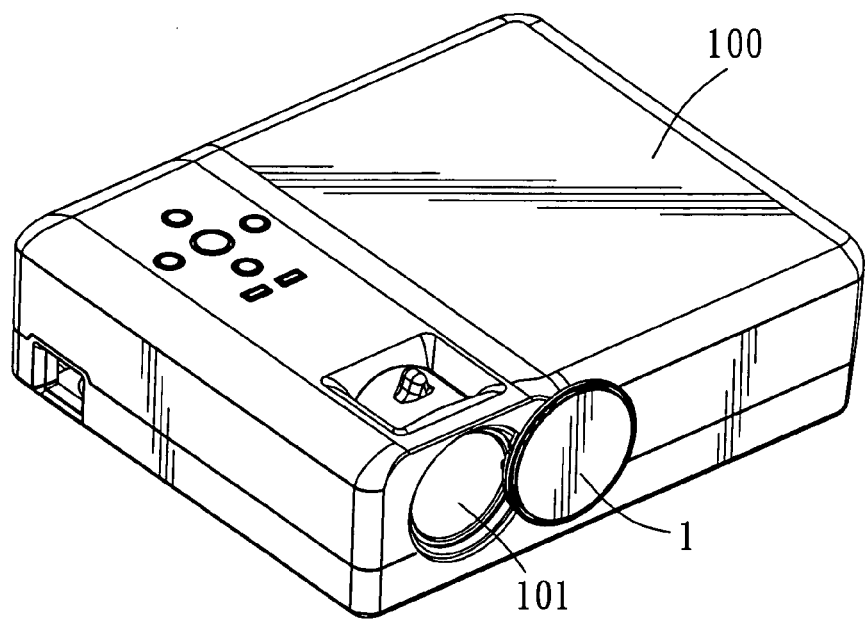
FIG. 2 is a perspective view of a projector that incorporates the preferred embodiment of a sliding lens cap according to the present invention.
Figure 3:
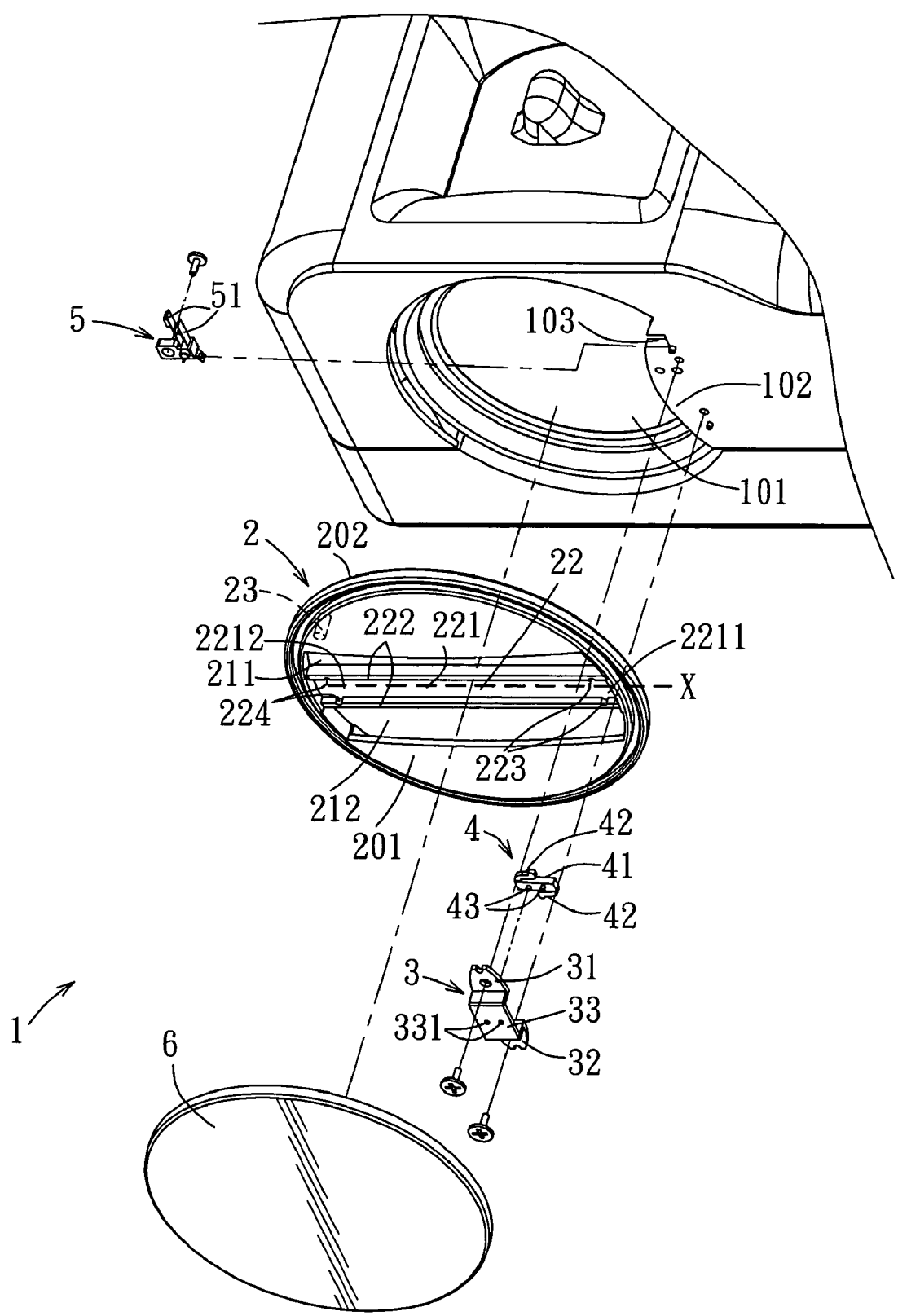
FIG. 3 is an exploded perspective view of the preferred embodiment.

Referring to FIGS. 2 and 3, the preferred embodiment of a sliding lens cap 1 according to this invention is adapted for covering and uncovering a lens unit 101 of a projector 100. The projector 100 has a housing formed with an opening for passage of light through the lens unit 101. The housing is formed with a cap-mounting flange 102 at a periphery of the opening. The cap-mounting flange 102 has an upper part formed with a notch 103 that is in spatial communication with the opening in the housing.

The sliding lens cap 1 comprises a slide plate 2 and a fixing member 3.

The slide plate 2 is circular in shape, and has an inner surface 202 to be disposed to confront the projector 100, and an outer surface 201 opposite to the inner surface 202. The slide plate 2 is further formed with a slide track unit. In this embodiment, the slide track unit includes a first track slot 211 formed through the outer and inner surfaces 201, 202, and a second track slot 212 parallel to the first track slot 211 and formed through the outer and inner surfaces 201, 202, thereby forming a slide rail 22 between the first and second track slots 211, 212. The slide rail 22 is formed with a pair of rail walls 222 which confine a rail groove 221 that is disposed at the outer surface 201 of the slide plate 2 and that extends parallel to the first and second track slots 211, 212. The rail groove 221 defines a groove axis (X), has opposite first and second groove end portions 2211, 2212, and first and second positioning units 223, 224 provided at the groove end portions 2211, 2212, respectively. In this embodiment, each of the first and second positioning units 223, 224 includes a pair of recesses formed respectively in the rail walls 222 of the slide rail 22 and disposed respectively at opposite sides of the groove axis (X).

Figure 4:
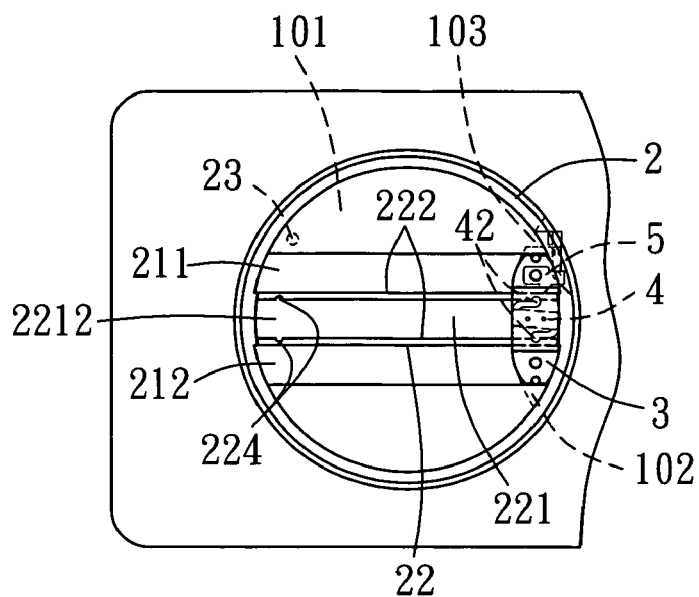
FIG. 4 is a schematic view illustrating a slide plate of the preferred embodiment in a covering position.
Figure 5:
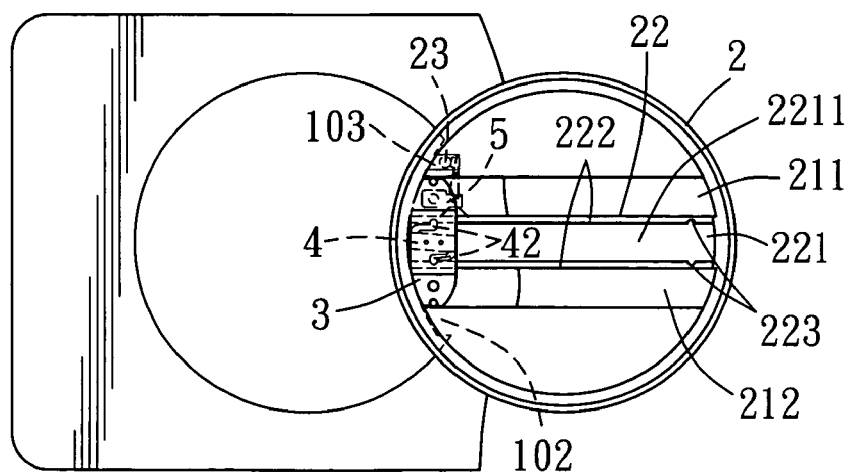
FIG. 5 is a schematic view illustrating the slide plate of the preferred embodiment in an uncovering position.

The fixing member 3 is adapted to be mounted on the projector 100 adjacent to the lens unit 101, and is in sliding engagement with the slide plate 2 at the slide track unit to permit slidable retention of the slide plate 2 on the projector 100 and to permit movement of the slide plate 2 between a covering position and an uncovering position relative to the lens unit 101, as shown in FIGS. 4 and 5. In this embodiment, the fixing member 3 has first and second mounting segments 31, 32 that are adapted to be mounted on the cap-mounting flange 102 with the use of screws, and a restricting segment 33 that is connected to the first and second mounting segments 31, 32, that extends through the first and second track slots 211, 212, and that abuts against the outer surface 201 of the slide plate 2 at the slide rail 22. Preferably, the restricting segment 33 is inverted U-shaped, straddles the slide rail 22, and has opposite ends that extend respectively into the first and second track slots 211, 212. The first and second mounting segments 31, 32 extend respectively from the opposite ends of the restricting segment 33 in opposite directions.

The restricting segment 33 is further formed with two pin holes 331. The sliding lens cap 1 further comprises a positioning member 4. In this embodiment, the positioning member 4 includes a block body 41, a pair of resilient arms 42, and two positioning pins 43. The block body 41 has opposite block ends opposite to each other along the groove axis (X), and opposite block sides disposed respectively on opposite sides of the groove axis (X). The positioning pins 43 project from the block body 41, and engage the pin holes 331 in the restricting segment 33 such that the block body 41 is connected to the restricting segment 33. The block body 41 is disposed in the rail groove 221. Each of the resilient arms 42 extends from a respective one of the block ends of the block body 41, and is disposed at a respective one of the block sides of the block body 41. The resilient arms 42 engage removably and respectively the recesses of the first and second positioning units 223, 224. In particular, the resilient arms 42 engage removably the recesses of the first positioning unit 223 to position releasably the slide plate 2 at the covering position (see FIG. 4), and engage removably the recesses of the second positioning unit 224 to position releasably the slide plate 2 at the uncovering position (see FIG. 5).

Figure 6:
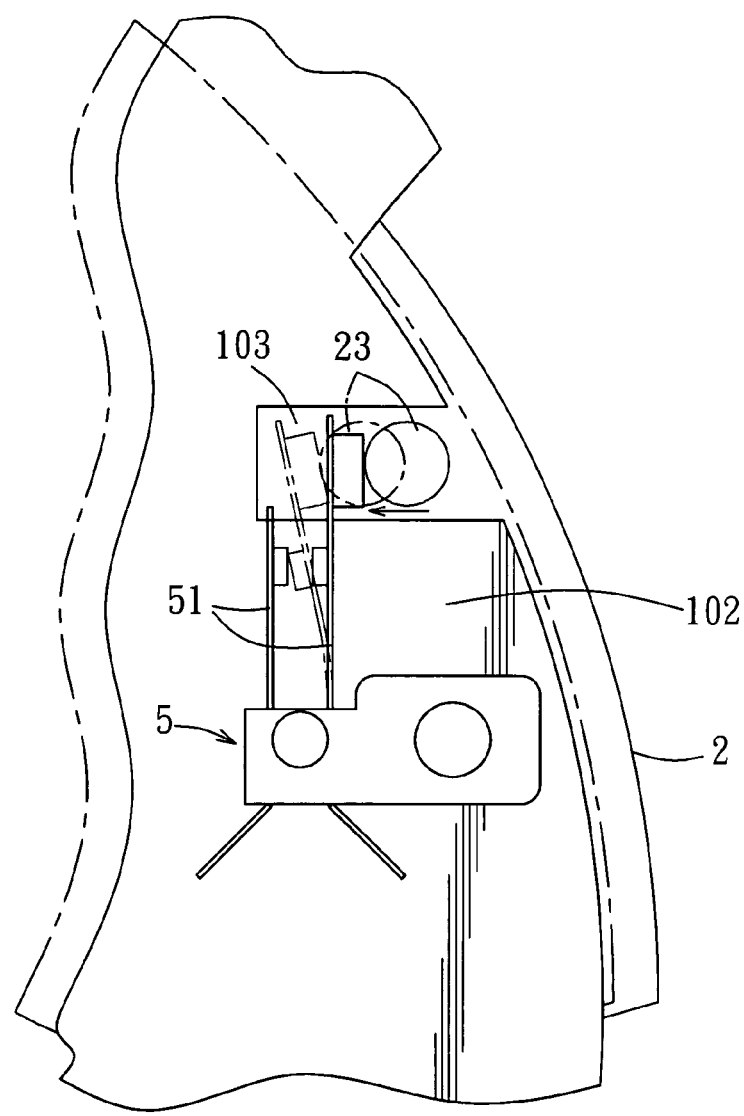
FIG. 6 is a schematic view illustrating actuation of a switch component of the preferred embodiment.
Figure 7:
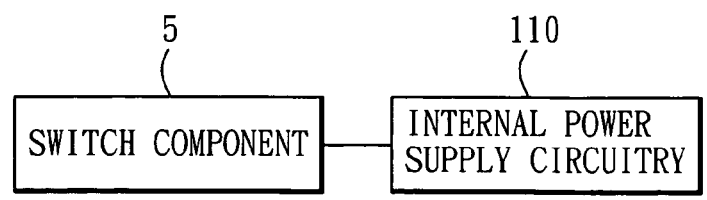
FIG. 7 is a circuit diagram to illustrate connection between the switch component and an internal power supply circuitry of the projector.

Referring to FIGS. 3, 5 and 6, the sliding lens cap 1 further comprises a switch component 5 that includes a pair of spaced apart contact arms 51, that is adapted to be mounted on an inner flange surface of the cap-mounting flange 102 and disposed below the notch 103, and that is operable to generate a switch signal when actuated. The contact arms 51 extend upwardly. A longer one of the contact arms 51 has a top end registered with the notch 103. The switch component 5 is coupled electrically to an internal power supply circuitry 110 of the projector 100, as shown in FIG. 7.

The slide plate 2 is further provided with a switch actuator 23 that is in the form of a stud, that extends transversely from the inner surface 202, that is disposed adjacent to the second groove end portion 2212, and that extends into the notch 103 to actuate the switch component 5 by moving one of the contact arms 51 to contact the other of the contact arms 51 when the slide plate 2 is disposed at the uncovering position, as shown in FIG. 6.

The sliding lens cap 1 further comprises a circular cover plate 6 secured to the outer surface 201 of the slide plate 2 to conceal the slide track unit and the fixing member 3, thereby preventing dust from gathering thereon and thereby resulting in a better appearance for the sliding lens cap 1.

In use, when the slide plate 2 is at the covering position (see FIG. 4), the first groove end portion 2211 of the rail groove 221 is adjacent to the fixing member 3, the slide plate 2 coincides with the lens unit 101, and the resilient arms 42 of the positioning member 4 engage the recesses of the first positioning unit 223 of the slide plate 2 to retain releasably the slide plate 2 at the covering position. On the other hand, when the slide plate 2 is slid to the uncovering position (see FIG. 5), the second groove end portion 2212 of the rail groove 221 is adjacent to the fixing member 3, the slide plate 2 is offset from the lens unit 101, and the resilient arms 42 of the positioning member 4 engage the recesses of the second positioning unit 224 of the slide plate 2 to retain releasably the slide plate 2 at the uncovering position. At the same time, as shown in FIG. 6, the switch actuator 23 extends into the notch 103 in the cap-mounting flange 102 to actuate the switch component 5, thereby enabling the latter to generate a switch signal. The switch component 5 is coupled electrically to the internal power supply circuitry 110 of the projector 100 such that the internal power supply circuitry 110 enables operation of the projector 100 only when the slide plate 2 is at the uncovering position.

In sum, unlike the conventional lens cap 10 described hereinabove, the sliding lens cap 1 of this invention is mounted directly on the housing of the projector 100, and can be operated to cover and uncover the lens unit 101 with relative ease. Moreover, in view of the presence of the switch component 5 and the switch actuator 23, damage to the lens cap 1 due to strong light through the lens unit 101 of the projector 100 can be avoided.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

We claim:

1. A sliding lens cap adapted for covering and uncovering a lens unit of a projector, said sliding lens cap comprising:
   a slide plate formed with a slide track unit, said slide plate having an inner surface adapted to be disposed to confront said projector, and an outer surface opposite to said inner surface; and
   a fixing member adapted to be mounted on said projector adjacent to said lens unit and in sliding engagement with said slide plate at said slide track unit to permit slidable retention of said slide plate on said projector and to permit movement of said slide plate between a covering position and an uncovering position relative to said lens unit;
   wherein said slide track unit includes a first track slot and a second track slot formed through said outer and inner surfaces of said slide plate, said second track slot being parallel to said first track slot, said slide track unit further including a slide rail formed between said first and second track slots;
   wherein said fixing member having a first mounting segment and a second mounting segment adapted to be mounted on said projector, and a restricting segment connected to said first and second mounting segments and extending through said first and second track slots, said restricting segment abutting against said outer surface of said slide plate;
   wherein said slide rail is formed with a rail groove at said outer surface of said slide plate, said rail groove extending parallel to said first and second track slots, said slide rail having first and second positioning units provided at opposite groove end portions of said rail groove, respectively, said sliding lens cap further comprising a positioning member connected to said restricting segment of said fixing member and disposed in said rail groove, said positioning member engaging removably said first positioning unit to position releasably said slide plate at said covering position, and engaging removably said second positioning unit to position releasably said slide plate at said uncovering position; and wherein said rail groove has a groove axis, each of said first and second positioning units including a pair of recesses formed in said slide rail and disposed respectively at opposite sides of said groove axis, said positioning member having a pair of resilient arms for engaging removably and respectively said recesses of said first and second positioning units.

2. The sliding lens cap as claimed in claim 1, wherein said restricting segment is inverted U-shaped, and said first and second mounting segments extend respectively from opposite ends of said restricting segment in opposite directions.

3. The sliding lens cap as claimed in claim 1, wherein said positioning member includes a block body connected to said restricting segment of said fixing member, said block body having opposite block ends opposite to each other along said groove axis, and opposite block sides disposed respectively on opposite sides of said groove axis, each of said resilient arms extending from a respective one of said block ends of said block body and being disposed at a respective one of said block sides of said block body.

4. The sliding lens cap as claimed in claim 1, further comprising a switch component adapted to be mounted on said projector adjacent to said lens unit and operable to generate a switch signal when actuated, said slide plate being provided with a switch actuator for actuating said switch component when said slide plate is disposed at said uncovering position.

5. The sliding lens cap as claimed in claim 1, claim further comprising a cover plate secured to said outer surface of said slide plate.

6. A sliding lens cap adapted for covering and uncovering a lens unit of a projector, said sliding lens cap comprising:

a slide plate formed with parallel first and second track slots to form a slide rail between said first and second track slots; and a fixing member adapted to be mounted on said projector adjacent to said lens unit and in sliding engagement with said slide rail to permit slidable retention of said slide plate on said projector and to permit movement of said slide plate between a covering position and an uncovering position relative to said lens unit;

said fixing member having an inverted U-shaped restricting segment straddling said slide rail and having opposite ends extending respectively into said first and second track slots, and first and second mounting segments connected respectively to said opposite ends of said restricting segment, at least one of said first and second mounting segments being adapted to be mounted on said projector;

wherein said slide rail is formed with a rail groove extending parallel to said first and second track slots, said slide rail having first and second positioning units provided at opposite groove end portions of said rail groove, respectively, said sliding lens cap positioning member connected further comprising a positioning member connected to said restricting segment of said fixing member and disposed in said rail groove, said positioning member engaging removably said first positioning unit to position releasably said slide plate at said covering position, and engaging removably said second positioning unit to position releasably said slide plate at said uncovering position; and wherein said rail groove has a groove axis, each of said first and second positioning units including a pair of recesses formed in said slide rail and disposed respectively at opposite sides of said groove axis, said positioning member having a pair of resilient arms for engaging removably and respectively said recesses of said first and second positioning units.

7. The sliding lens cap as claimed in claim 6, wherein said positioning member includes a block body connected to said restricting segment of said fixing member, said block body having opposite block ends opposite to each other along said groove axis, and opposite block sides disposed respectively on opposite sides of said groove axis, each of said resilient arms extending from a respective one of said block ends of said block body and being disposed at a respective one of said block sides of said block body.

8. The sliding lens cap as claimed in claim 6, further comprising a switch component adapted to be mounted on said projector adjacent to said lens unit and operable to generate a switch signal when actuated, said slide plate being provided with a switch actuator for actuating said switch component when said slide plate is disposed at said uncovering position.

9. The sliding lens cap as claimed in claim 6, claim further comprising a cover plate secured to said slide plate.

* * * * *